United States Patent
Li et al.

(10) Patent No.: US 9,083,500 B2
(45) Date of Patent: *Jul. 14, 2015

(54) METHODS AND APPARATUS FOR MULTI-CARRIER COMMUNICATION SYSTEMS WITH AUTOMATIC REPEAT REQUEST (ARQ)

(71) Applicant: Neocific, Inc., Bellevue, WA (US)

(72) Inventors: Xiaodong Li, Kirkland, WA (US); Haiming Huang, Bellevue, WA (US); Titus Lo, Bellevue, WA (US); Kemin Li, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,597

(22) Filed: Oct. 29, 2013

(65) Prior Publication Data
US 2014/0056261 A1 Feb. 27, 2014

Related U.S. Application Data

(63) Continuation of application No. 10/583,239, filed as application No. PCT/US2005/003889 on Feb. 7, 2005, now Pat. No. 8,571,057.

(60) Provisional application No. 60/542,317, filed on Feb. 7, 2004.

(51) Int. Cl.
*H04J 3/16* (2006.01)
*G08C 25/02* (2006.01)
(Continued)

(52) U.S. Cl.
CPC ............ *H04L 5/0055* (2013.01); *H04L 1/0026* (2013.01); *H04L 1/1671* (2013.01); *H04L 1/0003* (2013.01); *H04L 1/0013* (2013.01); *H04L 1/1816* (2013.01); *H04L 1/1819* (2013.01); *H04L 1/1822* (2013.01); *H04L 1/1845* (2013.01); *H04L 2001/0092* (2013.01)

(58) Field of Classification Search
CPC . H04L 1/1819; H04L 12/1868; H04L 5/0055; H04W 28/04; H04W 28/085
USPC .......................... 370/320, 335, 465; 714/748
See application file for complete search history.

(56) References Cited

U.S. PATENT DOCUMENTS

5,909,469 A 6/1999 Frodigh et al.
6,519,731 B1 2/2003 Huang et al.
(Continued)

FOREIGN PATENT DOCUMENTS

KR 20030023545 A 3/2003

OTHER PUBLICATIONS

International Search Report and Written Opinion; International Application No. PCT/US05/03889; Filed: Feb. 7, 2005; Applicant: Waltical Solutions, Inc.; Mailed on Jun. 10, 2005; 8 pages.

(Continued)

*Primary Examiner* — Dang Ton
*Assistant Examiner* — Ryan Kavleski
(74) *Attorney, Agent, or Firm* — Perkins Coie LLP

(57) ABSTRACT

Hybrid ARQ is employed in a multi-carrier communication system for retransmission of erroneous packets by taking advantage of time/frequency/space diversity and by combining ARQ functions at physical layer and MAC layers, making the multi-carrier system more robust in a high packet-error environment.

14 Claims, 6 Drawing Sheets

(51) Int. Cl.
　　*H04L 5/00*　　　(2006.01)
　　*H04L 1/16*　　　(2006.01)
　　*H04L 1/00*　　　(2006.01)
　　*H04L 1/18*　　　(2006.01)

(56) References Cited

U.S. PATENT DOCUMENTS

| | | |
|---|---|---|
| 7,203,508 B2 | 4/2007 | Ohkubo et al. |
| 7,272,110 B2 | 9/2007 | Lee et al. |
| 7,333,546 B2 | 2/2008 | Kim et al. |
| 7,421,644 B2 | 9/2008 | Mantha et al. |
| 7,447,968 B2 | 11/2008 | Ha et al. |
| 7,469,146 B2 | 12/2008 | Soong et al. |
| 7,532,600 B2 | 5/2009 | Hu et al. |
| 7,590,094 B2 | 9/2009 | Qian et al. |
| 7,664,141 B2 | 2/2010 | Zhuyan |
| 7,746,800 B2 | 6/2010 | Raghothaman et al. |
| 8,359,506 B2 | 1/2013 | Seok et al. |
| 8,571,057 B2 | 10/2013 | Li et al. |
| 2001/0056560 A1 | 12/2001 | Khan et al. |

OTHER PUBLICATIONS

3GPP Technical Specification 25.308 version 6.0.0 Release 6; European Telecommunications Standards Institute; 2003; 31 pgs.
3GPP Technical Specification 25.950 version 4.0.0 Release 4; European Telecommunications Standards Institute; 2001; 29 pgs.

METHODS AND APPARATUS FOR MULTI-CARRIER COMMUNICATION SYSTEMS WITH AUTOMATIC REPEAT REQUEST (ARQ)

CROSS-REFERENCE TO RELATED APPLICATION(S)

This application is a continuation of, and incorporates by reference in its entirety, U.S. patent application Ser. No. 10/583,239, now U.S. Pat. No. 8,571,057, filed Oct. 16, 2008, entitled "METHODS AND APPARATUS FOR MULTI-CARRIER COMMUNICATION SYSTEMS WITH AUTOMATIC REPEAT REQUEST (ARQ)," which is a 371 of PCT Application No. PCT/US2005/003889, filed Feb. 7, 2005, entitled "METHODS AND APPARATUS FOR MULTI-CARRIER COMMUNICATION SYSTEMS WITH AUTOMATIC REPEAT REQUEST (ARQ)," which claims the benefit of U.S. Provisional Patent Application No. 60/542,317, filed Feb. 7, 2004, entitled "METHODS AND APPARATUS FOR MULTI-CARRIER COMMUNICATION SYSTEMS WITH AUTOMATIC REPEAT REQUEST (ARQ)." This application also relates to PCT Application No. PCT/US2005/003518titled "METHODS AND APPARATUS FOR OVERLAYING MULTI-CARRIER AND DIRECT SEQUENCE SPREAD SPECTRUM SIGNALS IN A BROADBAND WIRELESS COMMUNICATION SYSTEM," filed Jan. 27, 2005, which claims the benefit of U.S. Provisional Application No. 60/540,032 filed Jan. 29, 2004 and U.S. Provisional Application No. 60/540,586 filed Jan. 30, 2004.

BACKGROUND

Automatic Repeat Request (ARQ) schemes are often used in packet communication systems to improve transmission reliability. Hybrid ARQ is a method that combines both FEC (forward error correction) and ARQ where previously unsuccessful transmissions are used in FEC decoding instead of being discarded. Hybrid ARQ enhances the effectiveness of FEC decoding and allows FEC blocks to be sent at high error rate operating points (S. B. Wicker, *Error Control Systems for Digital Communication and Storage*, Prentice-Hall, Inc., 1995).

One form of hybrid ARQ is "Chase" combining where the transmitter retransmits the same coded data packet (D. Chase, "*Code Combing: A maximum-likelihood decoding approach for combining an arbitrary number of noisy packets,*" IEEE Trans. on Commun., Vol. 33, pp.593-607, May, 1985). The decoder at the receiver combines multiple copies of this transmitted packet in a certain manner. Another form is called incremental redundancy, where instead of sending simple repeats of the coded data packet, progressive parity packets are sent in each subsequent transmission of the packet. The decoder then combines packets with incremental information in an appropriate fashion and therefore decodes the packet at a lower code rate.

Hybrid ARQ normally involves the functionality at the physical layer and controls the FEC encoding and FEC decoding functions using an embedded physical layer fast feedback channel for control signaling. At times, the physical layer hybrid ARQ-FEC blocks may be retransmitted for the maximum number of times without success. Therefore, it alone cannot provide error free data delivery but permits operation at a lower signal-to-interference-plus-noise ratio (SINR).

Medium access control (MAC) ARQ is an error control feature which retransmits erroneous MAC packet data units (PDUs) in a flexible fashion to achieve error free data delivery. MAC-ARQ retransmissions may occur long after original transmission and the retransmission may be segmented and piggy backed on other MAC PDUs using the granularity of the defined ARQ block size.

DETAILED DESCRIPTION systems are described herein. In particular, methods and apparatus are devised to carry out retransmission of erroneous packets by taking advantage of time/frequency/space diversity. In addition, a hierarchical ARQ scheme is designed to combine ARQ functionality at physical layer and MAC layers, thereby making the multi-carrier system more robust in a high packet-error environment.

The multi-carrier system mentioned here can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Multi-Carrier Communication System

The physical media resource (e.g., radio or cable) in a multi-carrier communication system can be divided in both the frequency and time domains. This canonical division provides a high flexibility and fine granularity for resource sharing.

The basic structure of a multi-carrier signal in the frequency domain is made up of subcarriers. Within a particular spectral band or channel, there are a fixed number of subcarriers, which are of three types:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 1:
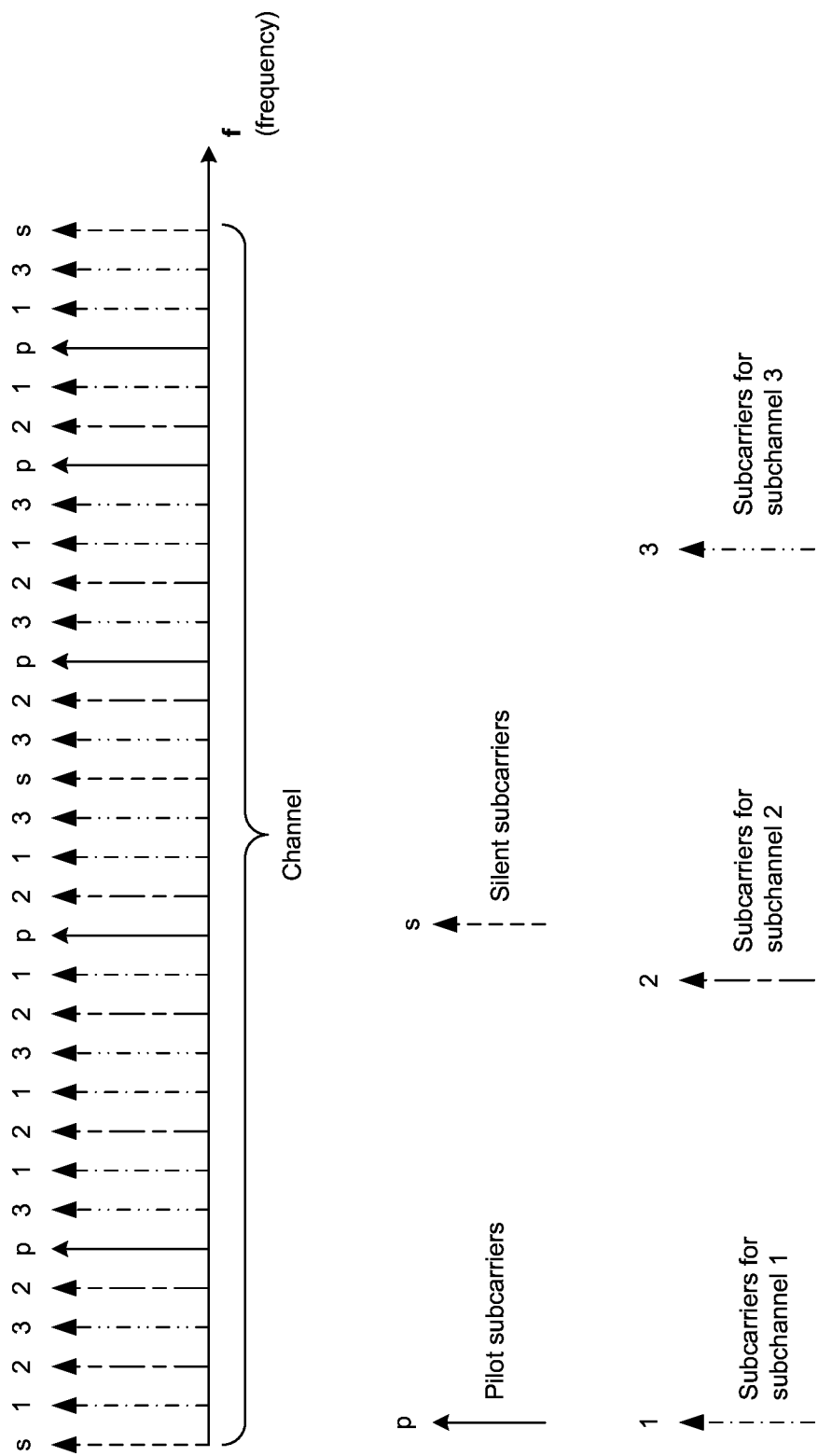
FIG. 1 illustrates a basic structure of a multi-carrier signal in the frequency domain, made up of subcarriers.

The data subcarriers can be arranged into groups called subchannels to support scalability and multiple-access. The carriers forming one subchannel are not necessarily adjacent to each other. Each subscriber may use part or all of the subchannels. The concept is illustrated in FIG. 1, which illustrates a basic structure of a multi-carrier signal in the frequency domain, made up of subcarriers. Data subcarriers can be grouped into subchannels in a particular manner. The pilot subcarriers are also distributed over the entire channel in a specific manner.

Figure 2:
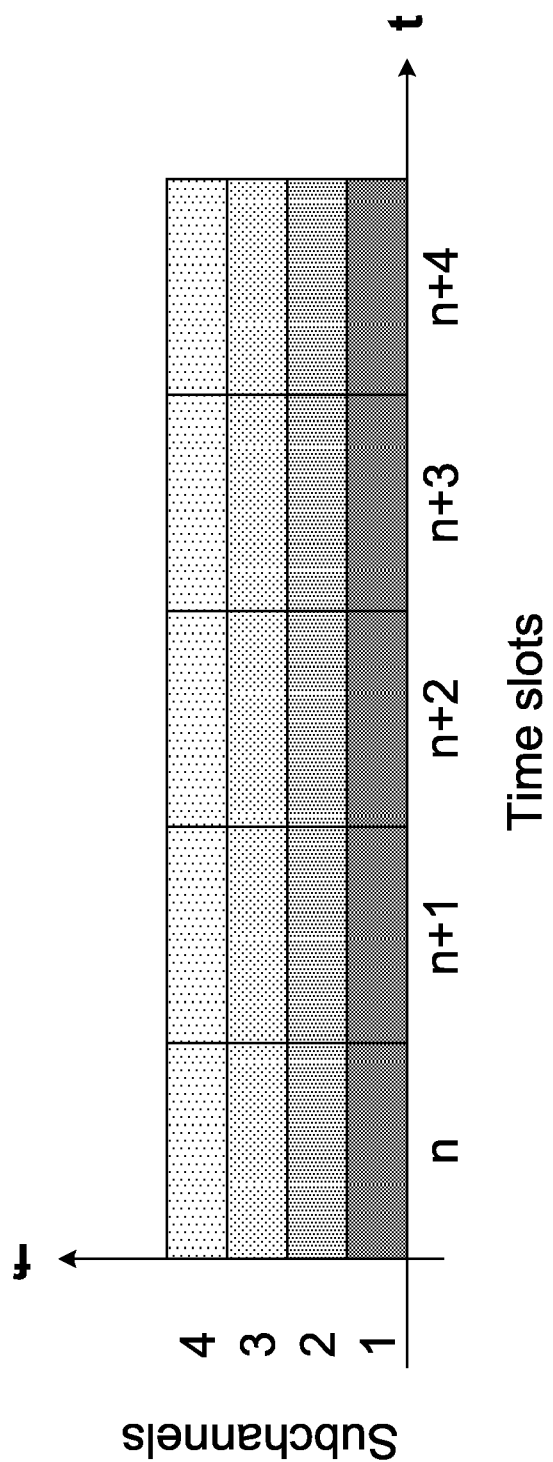
FIG. 2 illustrates a radio resource divided into small units in both the frequency and time domains: subchannels and time slots.

The basic structure of a multi-carrier signal in the time domain is made up of time slots to support multiple-access. The resource division in both the frequency and time domains is depicted in FIG. 2, which illustrates a radio resource divided into small units in both the frequency and time domains: subchannels and time slots.

Adaptive modulation and coding (AMC) adjusts the modulation and coding scheme in response to various channel conditions. It can be controlled for one individual subchannel or a group of subchannels. Table 1 provides an example of the coding and modulation schemes in AMC and corresponding spectral efficiency in bits/s/Hz.

TABLE 1

Examples of coding and modulation schemes in adaptive modulation and coding control.

| Modulation Scheme | Code Rate | Bits/s/Hz |
|---|---|---|
| QPSK | 1/8 | 1/4 |
| QPSK | 1/4 | 1/2 |
| QPSK | 1/2 | 1 |
| 16QAM | 1/2 | 2 |
| 16QAM | 3/4 | 3 |
| 64QAM | 2/3 | 4 |
| 64QAM | 5/6 | 5 |

Figure 3:
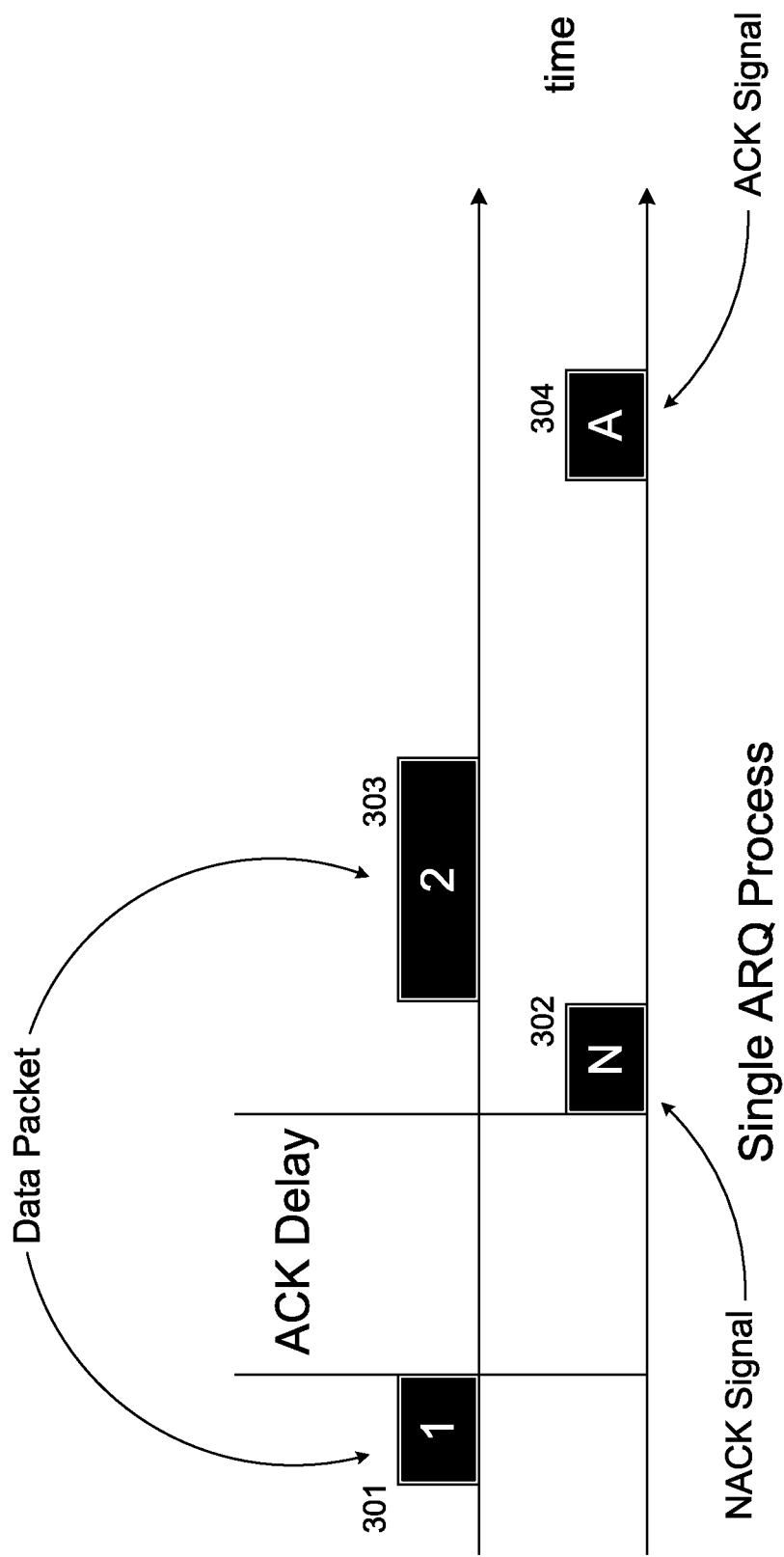
FIG. 3 illustrates a single ARQ process where a first transmission of a packet has failed with an NACK feedback, and a second transmission of the packet (may or may not be of the same size) has succeeded with an ACK feedback.

FIG. 3 illustrates a single ARQ process where the first transmission of packet 301 has failed with the NACK feedback 302, and the second transmission of packet 303 (may or may not be of the same size) has succeeded with the ACK feedback 304.

The ARQ Scheme

In a multi-carrier system, multiple subchannels can be used to transmit packets. Here, the hybrid ARQ scheme is used for at least one of the subchannels. Without loss of generality, one such subchannel is hereby designated as $SC_i$. For each of the packets transmitted over $SC_i$, the receiver performs a receiving process, based on the received information, which corresponds to the transmission process. Subsequently the receiver performs error detection on the received packet, and based on the detection result, sends an acknowledgement (ACK or NACK) signal, via a return channel, to inform the transmitter whether the reception of this particular packet was successful (ACK) or not (NACK).

In one embodiment, a channel quality indicator (CQI), indicating channel conditions, is transmitted along with the ACK/NACK signal to assist the selection of a subchannel to be used for the retransmission of the failed packet or the transmission of the next packet. The CQI is a function of, e.g., the signal-to-noise ratio (SNR), signal-to-interference-plus-noise ratio (SINR), bit error rate, symbol error rate, packet error rate, frame error rate, pilot signal power level, signal mean square error, or any combination thereof, which are measured based on the previous packet(s). In another embodiment the channel quality information transmitted along with the ACK/NACK signal comprises channel measurements.

After the transmitter receives a NACK signal, it selects a different subchannel, e.g. $SC_j$, to retransmit the failed packet since $SC_j$ may have a different channel response and a different interference level than $SC_i$, thereby creating frequency and time diversity effects that can be taken advantage of at the receiver to improve the performance. At the receiver, for the demodulation and decoding of the packet, the previously received signals that have been stored at the physical layer and the newly received retransmission signals may be combined.

In one embodiment, Chase combining is used where the soft samples of the same packet from previous transmission(s) and the current retransmission are combined coherently to provide additional diversity gain. In another embodiment, incremental redundancy is used where progressive parity packets are sent in each subsequent transmission of the packet. The retransmission process and the receiving process can continue until the packet is successfully received or a pre-specified number of retransmissions is reached.

The transmitter can reconfigure a subchannel for retransmission. This reconfiguration can be carried out in any combination of time, frequency, space, signal power, modulation, coding, or other signal domains. For example, in case of orthogonal frequency division multiple-access (OFDMA) signals, the transmitter can change the subcarrier composition of a subchannel. The newly composed subchannel may contain different subcarriers, as well as different training pilots, in terms of number, location, or other attributes.

In one embodiment, the transmitter randomly selects $SC_j$ from the subchannels available to the transmitter for the retransmission. In another embodiment, the transmitter, based on the information conveyed by CQI of all or some of the subchannels, selects a subchannel for retransmission in such a way that the system efficiency is optimized. For example, the subchannel with the best quality is assigned for retransmission of the packet that has failed multiple times.

Figure 4:
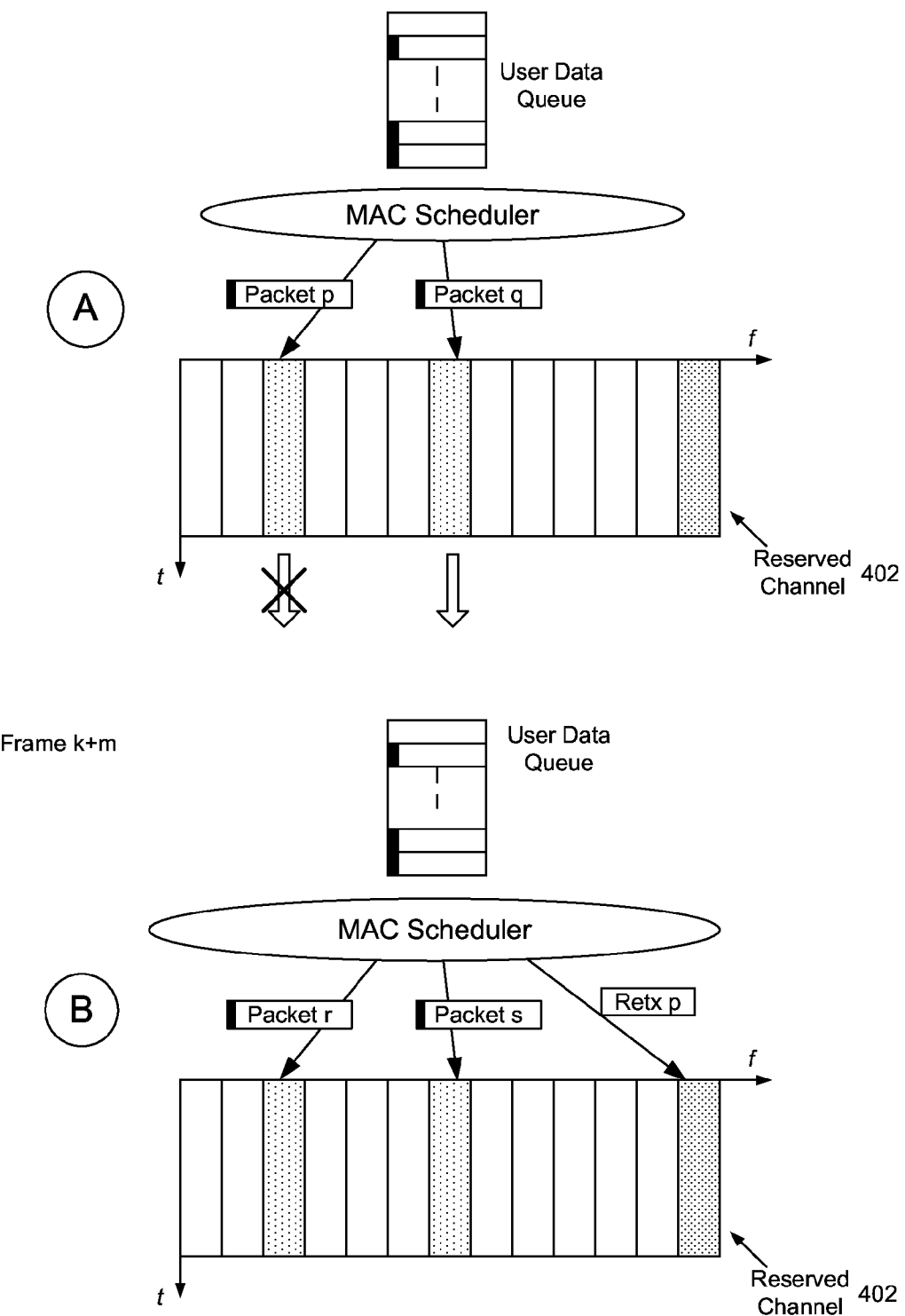
FIG. 4 depicts a system reserving at least one subchannel for retransmission of packets.

In yet another embodiment, the system reserves at least one subchannel for the retransmission of the packets. This process is illustrated in FIG. 4. In FIG. 4A, packets p and q from the same subscriber are transmitted, in Frame k, where packet p fails to be accurately received by the receiver and packet q succeeds. As depicted in FIG. 4B, packet p is retransmitted on a reserved channel 402 in Frame k+m. In FIG. 4 only one reserved subchannel is illustrated, while multiple reserved subchannels may be allocated in different embodiments.

Different embodiments take different measures to improve the channel quality of the reserved subchannels 402. In particular, in a multi-cell environment, a higher frequency reuse factor is used for reserved subchannels 402 to reduce the impact of the inter-cell interference. For instance, when regular subchannels have a reuse factor of 1, the reserved subchannels 402 may have a reuse factor of 3. The transmitter may select $SC_j$ randomly from the reserved subchannels 402, or select $SC_j$ with sufficiently high quality if the transmitter knows from the CQI information a quality of all or some of the reserved subchannels 402.

In one embodiment, the transmitter uses a modulation/coding/power scheme that matches the channel quality of that subchannel(s), in which case the retransmitted packet is fitted into the subchannel(s) by rate matching such as by repetition or puncturing.

Figure 5:
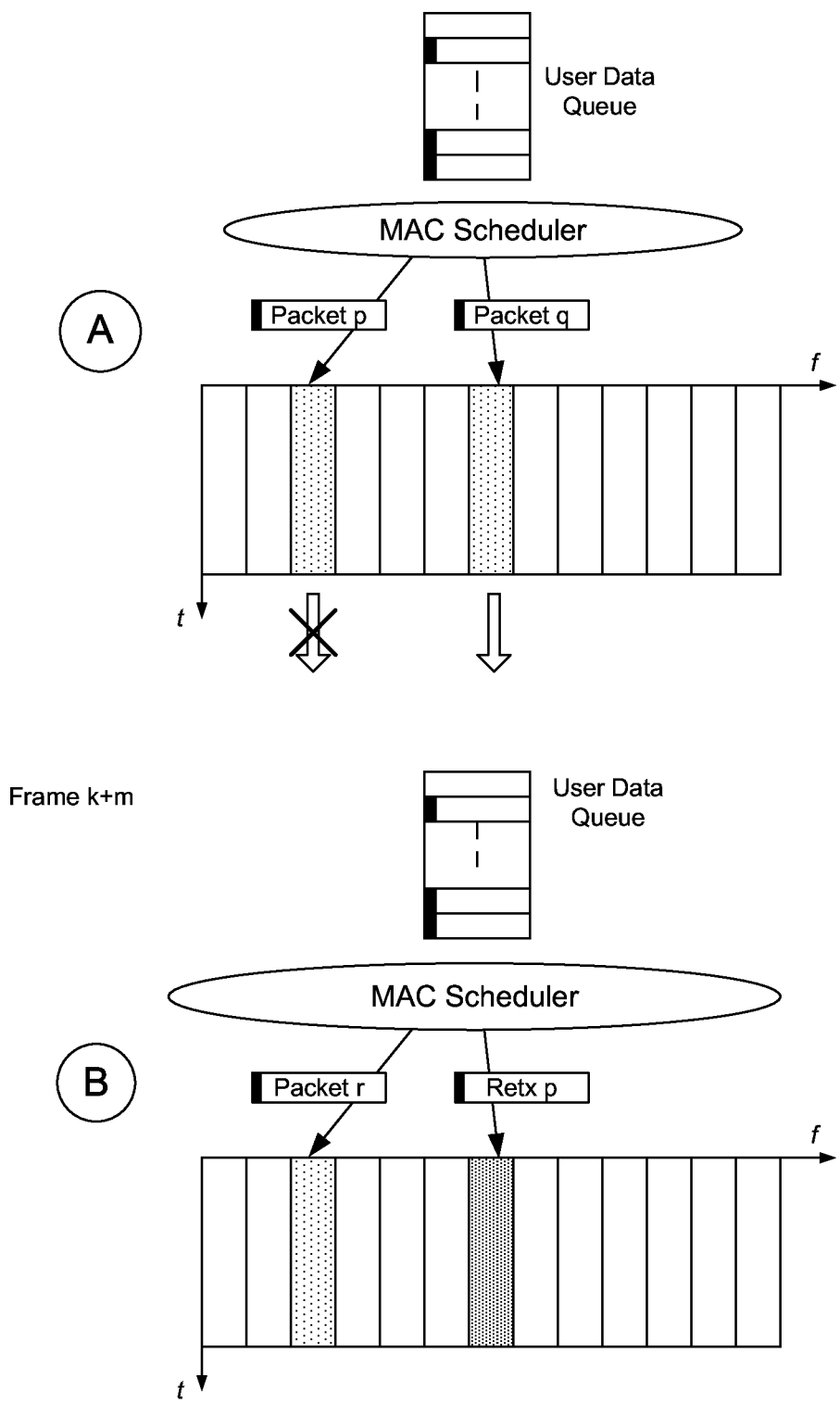
FIG. 5 depicts a case in which Packet p and q from same subscriber are transmitted in Frame k. Packet p fails and Packet q succeeds. Packet p is retransmitted on a subchannel that was originally scheduled for Packet q in Frame k+m.

In one embodiment, at least two subchannels are allocated for the transmitter by the system. Upon receiving a NACK signal indicating the need for retransmitting a packet, the transmitter swaps the transmission of the two subchannels $SC_i$ and $SC_j$ and sends the retransmission over $SC_j$ and sends the packet originally scheduled for $SC_j$ over $SC_i$. This process is illustrated in FIG. 5. In FIG. 5A, packets p and q from the same subscriber are transmitted, in Frame k, wherein packet p fails and packet q succeeds. In this situation, as depicted in FIG. 5B, packet p is retransmitted in Frame k+m via the subchannel over which packet q was sent. No reserved channel is provided in this embodiment.

In one embodiment, the retransmission over $SC_j$, uses the same settings, such as modulation, coding, and power, as the previous transmission over $SC_j$. When the packet size is different between the current transmission and previous transmission on $SC_j$, rate matching is used to fit the current retransmitted packet onto $SC_j$.

Figure 6:
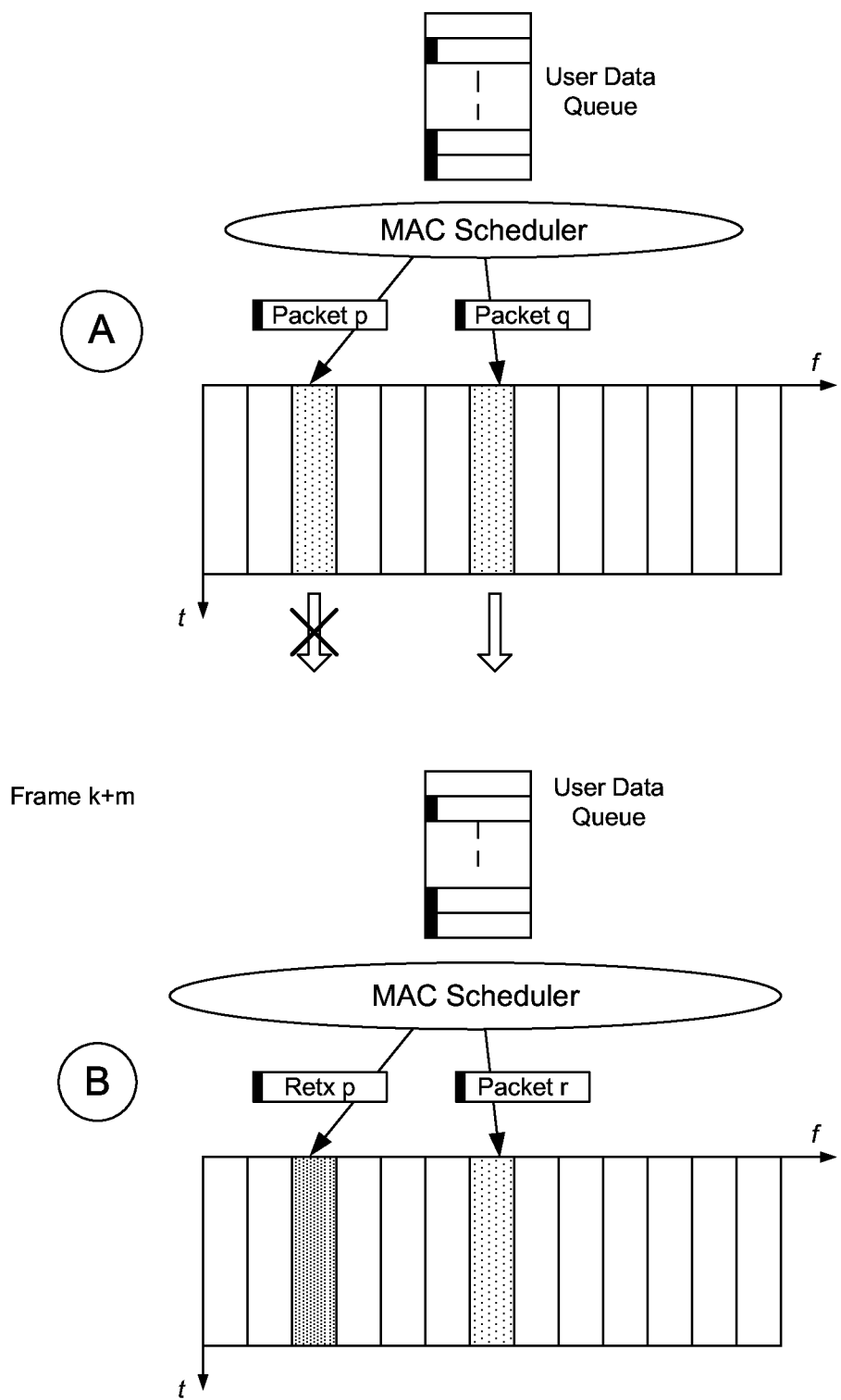
FIG. 6 depicts a case in which Packet p and q from same subscriber are transmitted in Frame k. Packet p fails and is retransmitted on same subchannel in Frame k+m.

In some cases it may be desirable for the transmitter to stay on the original subchannel for the retransmission. This process is illustrated in FIG. 6. In FIG. 6A packet p and q from the same subscriber are transmitted in Frame k, wherein packet p fails. As depicted in FIG. 6B packet p is retransmitted on the same subchannel in Frame k+m. If there are no other subchannels available to the transmitter at the time of retransmission, the transmitter selects $SC_j=SC_i$. If the transmitter has the knowledge about the quality of all or some of the subchannels and finds that the quality of $SC_i$ is good or better than the rest of the available subchannels, it again selects $SC_j=SC_i$.

In yet another embodiment, the channel quality of $SC_i$ is good and the modulation/coding index is high (16QAM or 64QAM), so the transmitter selects $SC_j=SC_i$. It should be noted, however, that the transmitter may lower down the modulation/coding scheme in the case of retransmission based on the channel quality report about the previously transmitted packets on the same subchannel.

In one embodiment, multiple subscribers may share one subchannel, for example, through time division multiplexing. Then multiple ARQ processes, each corresponding to a subscriber, can be carried out in parallel. The above described methods of retransmission are applicable to this embodiment.

In some embodiments, higher layer messaging dictates which retransmission process to be used. In other embodiments, information about a retransmission process is embedded in headers of retransmitted packets.

In one embodiment, a hierarchical ARQ process is implemented for a packet stream. The process includes an outer loop and at least one inner loop. The outer loop operates at a higher layer, for example, at the radio link protocol (RLP) layer, with a traditional ARQ approach such as sliding window selective-retransmission ARQ. The inner loops operate at lower layers, for example, the physical layer, with one of the hybrid ARQ methods described in the above embodiments.

The parameters for both the outer and the inner loop can be changed depending on the application or the unit processing capabilities. For example, the number of retransmissions within the inner loops is set smaller for delay-sensitive applications than for other delay-insensitive applications using TCP (Transmission Control Protocol). In one embodiment, the outer loop is removed for a UDP (User Datagram Protocol) packet stream such as VoIP (Voice over Internet Protocol) packets.

In one embodiment, the receiver combines the originally transmitted signal and the retransmitted signal, which are transmitted over the same or different subchannel, to detect the data packet.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:
1. A method for a transmitter in a communication system, the method comprising:
 allocating first and second subchannels for signal transmissions to a receiver in the communication system, the subchannels containing Orthogonal Frequency Division Multiplexing (OFDM) subcarriers;

transmitting, at a first transmission time, a first data packet over the first subchannel and a second data packet over the second subchannel;

receiving a signal from the receiver indicating an error in the first data packet received by the receiver; and transmitting, at a second transmission time, a redundancy version of the first data packet over the second subchannel and a third data packet originally scheduled for the second subchannel over the first subchannel, wherein the first subchannel and second subchannels have different spatial configurations.

2. The method of claim 1, wherein the transmission over the first or second subchannel uses an adaptive modulation and coding scheme.

3. The method of claim 1, wherein the transmission over the first or second subchannel uses a rate-matching scheme.

4. The method of claim 1, wherein the redundancy version of the first data packet is a progressive parity packet of the first data packet.

5. The method of claim 1, wherein the signal from the receiver indicating an error in the first data packet is a negative acknowledgement (NACK) from the receiver.

6. The method of claim 1, further comprising receiving a channel quality indicator (CQI), channel measurements, or both from the receiver.

7. A method for a receiver in a communication system, the method comprising:

receiving resource allocation information of first and second subchannels from a transmitter in the communication system, the subchannels containing Orthogonal Frequency Division Multiplexing (OFDM) subcarriers;

receiving from the transmitter, at a first reception time, a first data packet over the first subchannel and a second data packet over the second subchannel;

transmitting a signal to the transmitter indicating an error in the received first data packet;

receiving from the transmitter, at a second reception time, a redundancy version of the first data packet over the second subchannel and a third data packet originally scheduled for the second subchannel over the first subchannel, wherein the first subchannel and second subchannels have different spatial configurations; and combining the data received over the first subchannel at the first reception time and the data received over the second subchannel at the second reception time to recover the first data packet.

8. The method of claim 7, wherein the reception of the data packets over the first or second subchannel are performed in accordance with an adaptive modulation and coding scheme.

9. The method of claim 7, wherein the reception of the data packets over the first or second subchannel are performed in accordance with a rate-matching scheme.

10. The method of claim 7, wherein the redundancy version of the first data packet is a progressive parity packet of the first data packet.

11. The method of claim 7, wherein the signal to the transmitter indicating an error in the received first data packet is a negative acknowledgement (NACK).

12. The method of claim 7, further comprising transmitting a channel quality indicator (CQI), channel measurements, or both to the transmitter.

13. A transmitter for a communication system, the transmitter comprising:

an apparatus configured to allocate first and second subchannels for signal transmissions, the subchannels containing Orthogonal Frequency Division Multiplexing (OFDM) subcarriers;

an apparatus configured to transmit, at a first transmission time, a first data packet over the first subchannel and a second data packet over the second subchannel;

an apparatus configured to receive a signal indicating an error in the first data packet received by a receiver; and an apparatus configured to transmit, at a second transmission time, a redundancy version of the first data packet over the second subchannel and a third data packet originally scheduled for the second subchannel over the first subchannel, wherein the first subchannel and second subchannels have different spatial configurations.

14. A receiver for a communication system, the receiver comprising:

an apparatus configured to receive resource allocation information of first and second subchannels from a transmitter in the communication system, the subchannels containing Orthogonal Frequency Division Multiplexing (OFDM) subcarriers;

an apparatus configured to receive from the transmitter, at a first reception time, a first data packet over the first subchannel and a second data packet over the second subchannel;

an apparatus configured to transmit a signal to the transmitter indicating an error in the received first data packet;

an apparatus configured to receive, at a second reception time, a redundancy version of the first data packet over the second subchannel and a third data packet originally scheduled for the second subchannel over the first subchannel, wherein the first subchannel and second subchannels have different spatial configurations; and an apparatus configured to combine the data received over the first subchannel at the first reception time and the data received over the second subchannel at the second reception time to recover the first data packet.

* * * * *

UNITED STATES PATENT AND TRADEMARK OFFICE
CERTIFICATE OF CORRECTION

PATENT NO. : 9,083,500 B2  
APPLICATION NO. : 14/066597  
DATED : July 14, 2015  
INVENTOR(S) : Li et al.

Page 1 of 1

It is certified that error appears in the above-identified patent and that said Letters Patent is hereby corrected as shown below:

In the Specification

In column 1, lines 24-25, delete "PCT/US2005/003518titled" and insert -- PCT/US2005/003518 titled --, therefor.

In column 5, line 26, delete "$SC_j$," and insert -- $SC_j$ --, therefor.

In the Claims

In column 7, line 10, in claim 1, delete "subchannels" and insert -- subchannel --, therefor.

In column 7, line 42, in claim 7, delete "subchannels" and insert -- subchannel --, therefor.

In column 8, line 26, in claim 13, delete "subchannels" and insert -- subchannel --, therefor.

In column 8, line 46, in claim 14, delete "subchannels" and insert -- subchannel --, therefor.

Signed and Sealed this  
Ninth Day of February, 2016

Michelle K. Lee  
*Director of the United States Patent and Trademark Office*